United States Patent [19]

Catlin

[11] 3,727,007

[45] Apr. 10, 1973

[54] TELEPHONE SECURITY DEVICE

[75] Inventor: Richard Glenn Catlin, Winnipeg, Manitoba, Canada

[73] Assignee: Commercial Communications Ltd., Winnipeg, Manitoba, Canada

[22] Filed: Nov. 18, 1970

[21] Appl. No.: 90,767

[30] Foreign Application Priority Data

Nov. 19, 1964 Canada....................................067861

[52] U.S. Cl.................................................179/18 DA

[51] Int. Cl.................................................H04m 3/38

[58] Field of Search......................179/18 DA, 27 CB, 179/90 D

[56] References Cited

UNITED STATES PATENTS

| | | | |
|---|---|---|---|
| 3,553,382 | 1/1971 | Knox | 179/18 DA |
| 3,566,042 | 2/1971 | Pugliese | 179/27 CB |

*Primary Examiner*—William C. Cooper
*Attorney*—Cushman, Darby & Cushman

[57] ABSTRACT

In order to prevent the unauthorized use of dial-type telephone to make long distance calls, the security device of the present invention is connected to the wall-box at which the telephone cord is connected to the telephone Company's wiring. In position, it permits the effective dialing of up to say eight digits, and then prevents the effective dialing of any further digits until the telephone handset has been replaced and removed. The number of digits permitted will depend upon the type of installation, eight digits being used in a PABX: in a PABX a long distance direct dialed call requires the dialing of 9–1– and seven digits, i.e. 9 digits in all, and any attempted call is aborted in the absence of the last digit. A pulse-group counter stops the transmission of enough pulse-groups to make a distance-direct-dialed call. By the added subject matter of the present application, a zero detector circuit is added to disable all attempts to make long distance calls through the telephone operator.

9 Claims, 17 Drawing Figures

INVENTOR
RICHARD GLENN CATLIN

BY Cushman, Darby & Cushman
ATTORNEYS

INVENTOR
RICHARD GLENN CATLIN

BY Cushman, Darby & Cushman
ATTORNEYS

INVENTOR
RICHARD GLENN CATLIN

BY Cushman, Darby & Cushman
ATTORNEYS

INVENTOR
RICHARD GLENN CATLIN
BY Cushman, Darby & Cushman
ATTORNEYS

INVENTOR
RICHARD GLENN CATLIN

BY Cushman, Darby & Cushman
ATTORNEYS

PATENTED APR 10 1973 3,727,007

INVENTOR
RICHARD GLENN CATLIN

BY
Cushman, Darby & Cushman
ATTORNEYS

TELEPHONE SECURITY DEVICE

In order to prevent the unauthorized use of dial-type telephone handset to make long distance calls, the security device of the present invention is connected to the wall-box at which the handset cord is connected to the telephone Company's wiring. In position, it permits the effective dialing of up to say eight digits, and then prevents the effective dialing of any further digits until the telephone handpiece has been replaced and removed. The number of digits permitted will depend upon the type of installation, eight digits being used in a PABX: in a PABX a long distance direct dialed call requires the dialing of 9–1 and seven digits, i.e. nine digits in all, and any attempted call is aborted in the absence of the last digit. A pulse-group counter stops the transmission of enough pulse-groups to make a distance-direct-dialed call. By the added subject matter of the present application, a zero detector circuit is added to disable all attempts to make long distance calls through the telephone operator.

This invention relates to an improvement in a telephone security device the subject matter of patent application Ser. No. 46,624 filed June 16, 1970, F.B. Barton.

In order that the present disclosure may be complete, the subject matter of that earlier patent application will be repeated below, but it will be understood that the present application is directed not to that subject matter but to the addition of a zero detector circuit to disable all attempts to make long distance calls through the telephone operator.

Application Ser. No. 46,624 relates to dial-type telephone sets, in which a user can by repeated operation of the dial make use of automatic exchange facilities to cause his connection to another telephone set.

In commerce and in industry large privately owned telephone installations are often used, all connected to a private branch exchange (PBX) by means of which any telephone set in the installation can be connected to any other telephone set in the installation without making use of the telephone company lines external to the installation. Thus one common system is for each telephone set in the installation to be provided with a dial by which a user can make use of automatic exchange facilities in the PBX to connect himself automatically to any other telephone in the installation. In many installations, connection to an outside line must be made through an operator at the PBX, for example by dialing 0.

With the development of the size of these installations, the automatic facilities have in many cases been extended so that a user can, by first dialing 9, connect his telephone set to the telephone system of the external telephone company, and can then proceed to dial any external telephone number he wishes. For local calls, this is usually acceptable to the owner of the PBX, and when the system is used to make long distance calls through the telephone operator of the external telephone company, the record of such calls kept by that operator for charging purposes usually is sufficient to prevent any serious abuse of the ability of any telephone user in the installation to make long distance calls.

With the advent of "direct distance dialing," a user of any telephone set in the installation can first dial 9 to obtain connection to the external telephone company equipment, can then dial 1 to obtain automatic connection to the "direct distance dialing" equipment of the external telephone company, and then can proceed to call almost any telephone number in Canada and the United States. The equipment of the external telephone company records all such calls for charging purposes, but only identifies the calling PBX. As a result, the system is open to abuse by users of the telephone sets of the installation, there being no record of which telephone set was used to make the "direct distance dialing" call.

An object of the present invention is the provision of means by which use of a telephone set can be limited to the effective dialing of numbers having no more than a predetermined number of digits. For example, in a PBX system having less than 999 internal lines, the apparatus of the invention could be used to prevent all except a few of the telephone sets being used for the dialing of numbers having four or more digits, so that all calls external to the PBX must be routed through the PBX operator. The sets not fitted with the apparatus could still be used normally to use the 9 facility. As a further example, in a PBX system where local calls were to be permitted, the apparatus of the invention could be used to prevent the dialing of numbers having more than eight digits. A telephone set so fitted could be used freely to call any other internal telephone set; it could be used to call the PBX operator (by dialing 0); it could be used to call any "local" number (by dialing 9 and then the seven digit local number); it could be used to call the long distance operator (by dialing 9 and then 0); but it could not be used to make a direct dialed long distance call, which would necessitate dialing first 9, then 1, and then a seven figure telephone number. Any attempted call would be automatically aborted by the equipment of the external telephone company when the transmission of the last digit of the seven figure number had been delayed beyond their predetermined calling-time limit.

According to the earlier invention, a security device suitable for use with a dial-type telephone set having a handset, a cradle in or on which the handset rests when not in use, and a rotary signalling dial, the device being adapted to restrict the use of the dial to the effective dialing of a series of digits no greater in number than a predetermined number, comprises: connecting leads by which the device can be connected to terminals carrying dialed pulses from the signalling dial; pulse grouping means adapted to transform groups of received separate dialing pulses each into a group pulse by distinguishing between inter-pulse timing periods and inter-group timing periods; group-pulse counting means; and call aborting means arranged to prevent the effective transmission of dialing pulses once the group-pulse counting means has reached a predetermined count.

The invention will now be described, by way of example, with reference to the accompanying drawings, in which.

Figure 1:
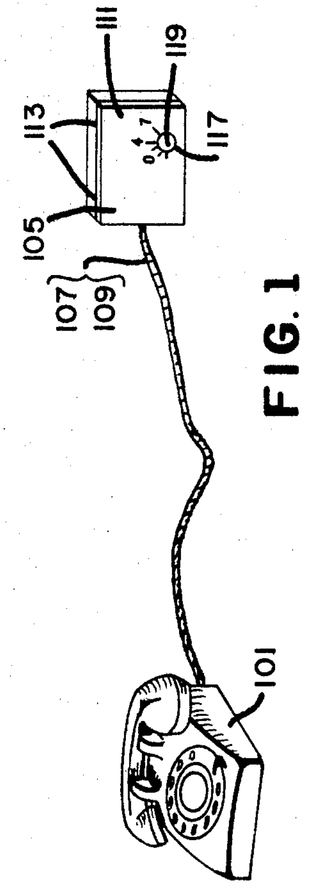
FIG. 1 is a schematic representation of a telephone to which the present invention is applied.

Referring first to FIG. 1, a dial-type telephone handset 101 is shown connected to a telephone security device 105 used in place of the orthodox telephone wall box to which the telephone company's lines are connected.

Figure 3:
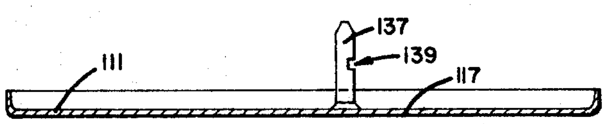
FIG. 3 is a sectional plan view of the cover shown in FIG. 1, and is taken on the line III-III, of FIG. 2.
Figure 4:
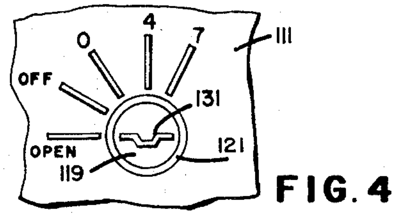
FIG. 4 is a scrap view of a front part of the cover shown in FIG. 2, showing graduations thereon.

This telephone security device 105 is in the form of a sheet metal box having a removable cover 111 formed along its upper edge with hook-like lugs 113 which hook into slots 115 formed in the upper side of the box. The cover 111 is formed with a circular aperture 117 to provide access to the rotatable cylinder 119 of a cylinder lock 121 which is mounted on a bracket 123 bolted to the inside of the box. The cylinder 119 is connected to a disc 125, which is for the most part circular but which is provided with a first peripheral recess 127 into which extends a bolt 129 carried by the bracket 123. This bolt thus limits rotation of the cylinder 119 to an arc in which the key slot 131 can be aligned with any one of five graduations (see FIG. 4) marked respectively OPEN, OFF, 0, 4, and 7. Disc 125 is also formed with a second peripheral recess 133 and the bracket 123 is formed with an aligned hole 135, while the cover 111 has welded to its inner side a normally extending pin 137 which, when the cover is properly in place, extends into hole 135 and through aligned recess 133. This pin 137 is formed with a slot 139 (see FIG. 3) of somewhat greater width than the thickness of the disc 125 and so positioned that the disc can be turned once the pin is fully inserted; the disc then holds the pin 137, and thus the cover 111, in place.

Summarizing what has been said above, by use of a key in the key slot 131, the disc 125 can be set to permit removal of the cover 111, or to lock it in place at will, and further, when the cover is locked in place, the cylinder 119 can be set to any of four other positions as desired. The lock is such that the key can be removed at any of the five mentioned settings of the cylinder.

The cylinder 119 of the lock is connected by an operating spindle to the rotatable contact disc 140 of a single wafter switch 141 mounted inside the box on its back wall. This wafer switch is standard in form and consist of an insulating wafer carrying round its periphery a number of contact lugs terminating in contact fingers. Some of these lugs are mounted on the front of the wafer, and some on the back, and to facilitate reference to these contact lugs, they have been numbered serially from 1 to 22, while FIGS. 6A to 6E show the contact lugs on the front of the wafer and FIGS. 7A to 7E show the contact lugs on the back of the wafer. It is to be noted that lugs 11 and 13 are permanently connected together, and that lugs 2, 22 and 20 are permanently connected together. Further, flexible leads A, B, E, F, G, H, I and J are connected respectively to contact lugs 18, 2, 7, 8, 15, 14 21 and 11 respectively. It will be seen that the contact disc 140 carries on its front side (FIGS. 6A to 6E)three contact strips 140A, 140B and 140C, and that it carries on its rear side (FIGS. 7A to 7E) two contact strips 140D and 140E, and that furthermore each such contact strip is for the most part annular but includes a short part of increased radial width. The contacts on those of the contact lugs which are used in the present apparatus extend radially to engage either the main annular part of a contact strip or only the radially extended parts of a contact strip. Thus contact lugs 1, 7, 8, 15 and 18 are radially long and the remaining contact lugs are radially short.

Also mounted inside the box is a 4.2 volt battery 161 having two flexible leads D and C and a contact strip 163 having a first contact 165 to which the green wire 107 is connected and a second contact 167 to which the red wire 109 is connected. Mounted inside the box on pillars fixed to the back wall of the box is a printed circuit board 171, shown pictorially in FIG. 2 and shown as a circuit diagram with the battery 161 and the switch 141 in FIG. 5.

Figure 5:
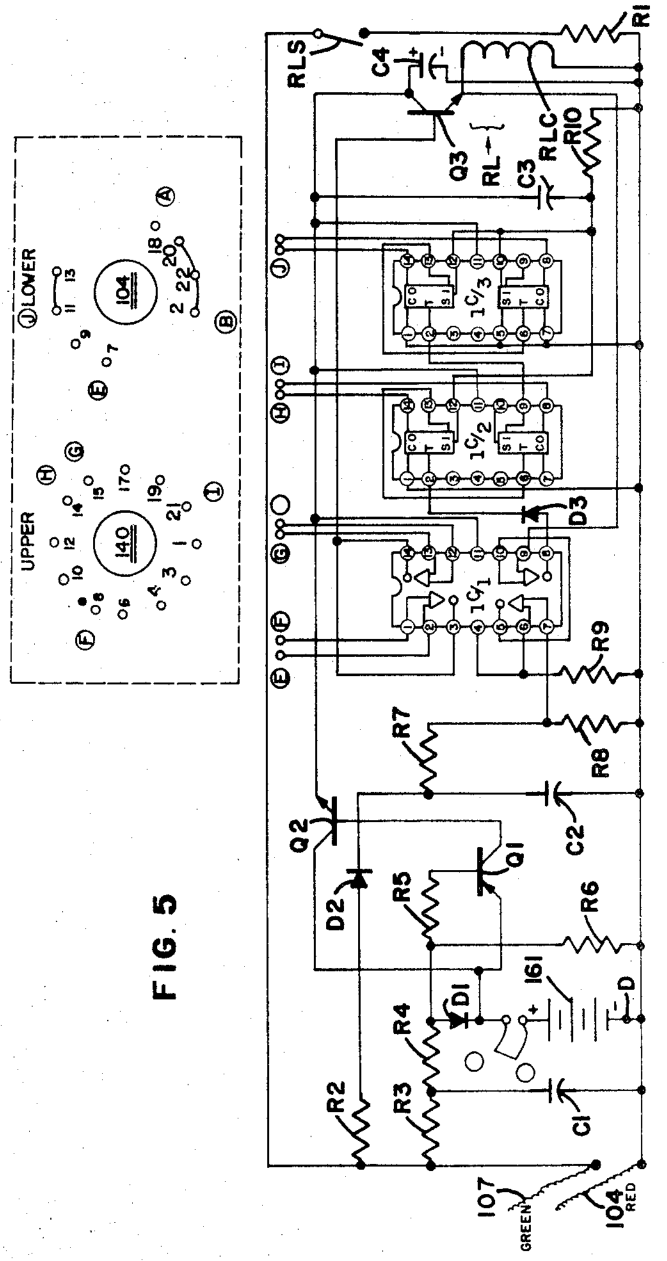
FIG. 5 is a circuit diagram of the telephone security device shown in FIGS. 1 and 2.
Figure 6A:
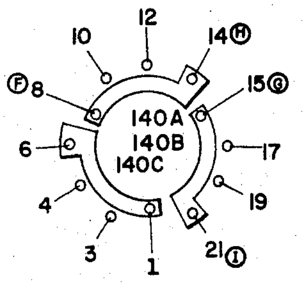
FIGS. 6A to 6E and FIGS. 7A to 7E are diagrammatic representations of the switch conditions in a wafer switch shown in FIG. 2.
Figure 7A:
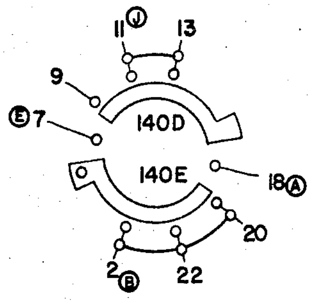
Figure 6B:
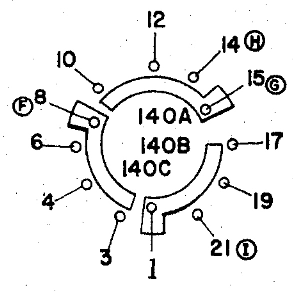
Figure 7B:
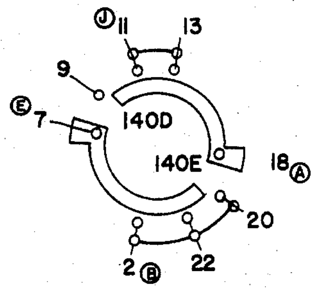
Figure 6C:
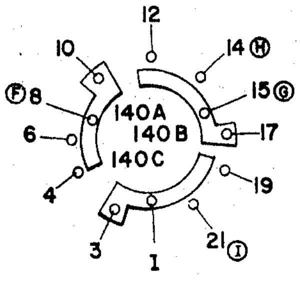
Figure 7C:
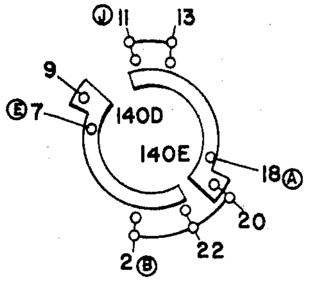
Figure 6D:
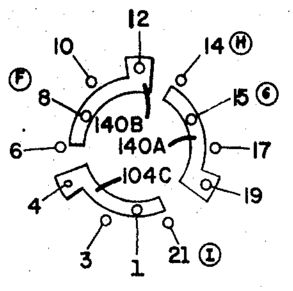
Figure 7D:
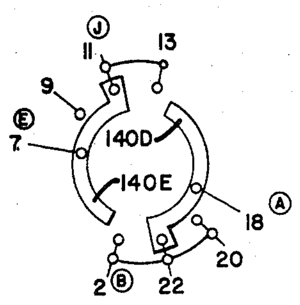
Figure 6E:
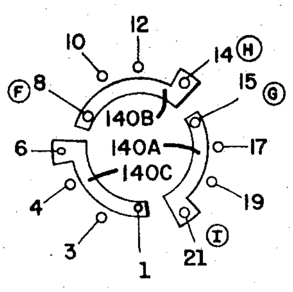
Figure 7E:
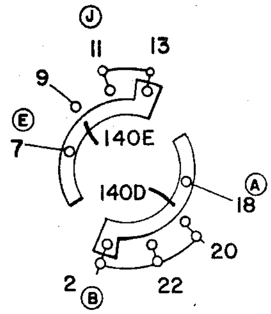

Referring first to FIG. 5, it will be seen that the circuit includes the battery 161; three transistors Q1, Q2 and Q3; three diodes D1, D2, and D3; four capacitors C1 to C4; ten resistors R1 to R10; three integrated circuits IC/1, IC/2 and IC/3; the switch 141; and a reed relay RL having an operating coil RLC and reed switch contacts RLS.

These components are further particularized as follows:

| Transistors | Component | | Diodes | |
|---|---|---|---|---|
| Q1 | 2N3638A | | D1 | IN914 |
| Q2 | 2N3705 | | D2 | IN914 |
| Q3 | 2N3705 | | D3 | IN914 |
| Capacitors | | | Integrated Circuit | |
| C1 | 500 MF | 25vDC | IC1 | MC724 P |
| C2 | 50 MF | 50vDC | IC2 | MC790 P |
| C3 | 50 MF | 10 v | | |
| C4 | 50 MF | 10v | | |
| Resistors | | | | |
| R1 | 1,500 | | | |
| R2 | 33,000 | | | |
| R3 | 15,000 | | | |
| R4 | 1,800 | | | |
| R5 | 1,000 | | | |
| R6 | 1,000 | | | |
| R7 | 2,700 | | | |
| R8 | 4,700 | | | |
| R9 | 47 | | | |
| R10 | 33,000 | | | |

The circuit diagram of FIG. 5 indicates the interconnection of these components, and in particular the flexible leads connecting the circuit board to the various switch contact lugs and the battery are given the reference letters A through J to indicate that points with the same reference letter are connected together by such a lead. In this circuit, transistor Q1 serves as an on-off switch which is sensitive to the position of the standard cradle switch on the telephone 1, and controls the transistor Q2 which acts as the main power switch for the device. The integrated circuits serve to count groups of pulses applied to the telephone wires 107 and 109 by the dialing mechanism; and reed relay RL serves as a switch to shunt all such pulses after a predetermined number of groups of pulses have been received.

OPERATION OF THE UNIT

It will be understood that although a key is used to reset the switch 141, that key is not normally in place, so that only an authorized person (possessing a key) can vary the setting of the device.

The electronics of this unit are powered by the 4.2 volt battery 161, which is a rechargeable type so that a slow charge is applied to the battery via diode D1 when the telephone is not in use, i.e. when the cradle switch is open.

In operation the device is bridged across the telephone line with the positive side of the line connected to the green wire 107 and the negative side to the red wire 109. The key slot 131 will usually be pointed at graduation 7.

When the telephone handset is removed from its cradle, the voltage across the line drops to a low value. This permits transistor Q1 to conduct and thus to turn on the power supply switching transistor Q2. When the power is turned on capacitor C3 provides a positive pulse to reset the integrated circuit counters IC2 and IC3. Capacitor C1 is a delay capacitor in the power supply circuit to prevent the power supply from turning off during dialing breaks in the telephone set circuit. Its delay is sufficient to prevent the device from resetting during dialing, while permitting resetting a short time after the telephone exchange has disconnected.

When dialing commences, the positive pulses are integrated and applied to a part of integrated circuit IC1 which is connected as a Schmidt trigger pulse former. The series or group of pulses generated during the dialings of any specific digit are formed into one pulse and are applied to the pulse integrated circuit counters IC2 and IC3.

The two integrated circuits IC2 and IC3 are dual J-K flip-flop integrated circuits. The required outputs of these circuits are selected by the setting of switch 141 and are applied to part of integrated circuit C1 which forms a decoder, and turns transistor Q3 on when the desired number of digits have been reached. This energizes the coil RLC of the reed relay RL so that the reed relay switch contacts RLS close. Thus shunts the two lines of the telephone system and so attenuates any subsequent pulses that they are too weak to operate the "exchange" circuits of the telephone company. Those exchange circuits will in standard fashion "abort" the call after a predetermined time.

To permit unrestricted dialing, the key slot 131 is switched to the OFF position. The slot must be in the OFF position when the unit is not across a working line to preserve the battery.

It will be seen that the key slot 131 can be used to set the switch 141 to permit up to seven digits to be dialed effectively; to permit up to four digits to be dialed effectively; to prevent any digits to be dialed (in this condition the reed relay being energized whenever the cradle switch on the handset closes); and to permit unrestricted dialing, when the key slot is aligned with the OFF position. The OPEN position is used only for removal of the cover 111.

Figure 9:
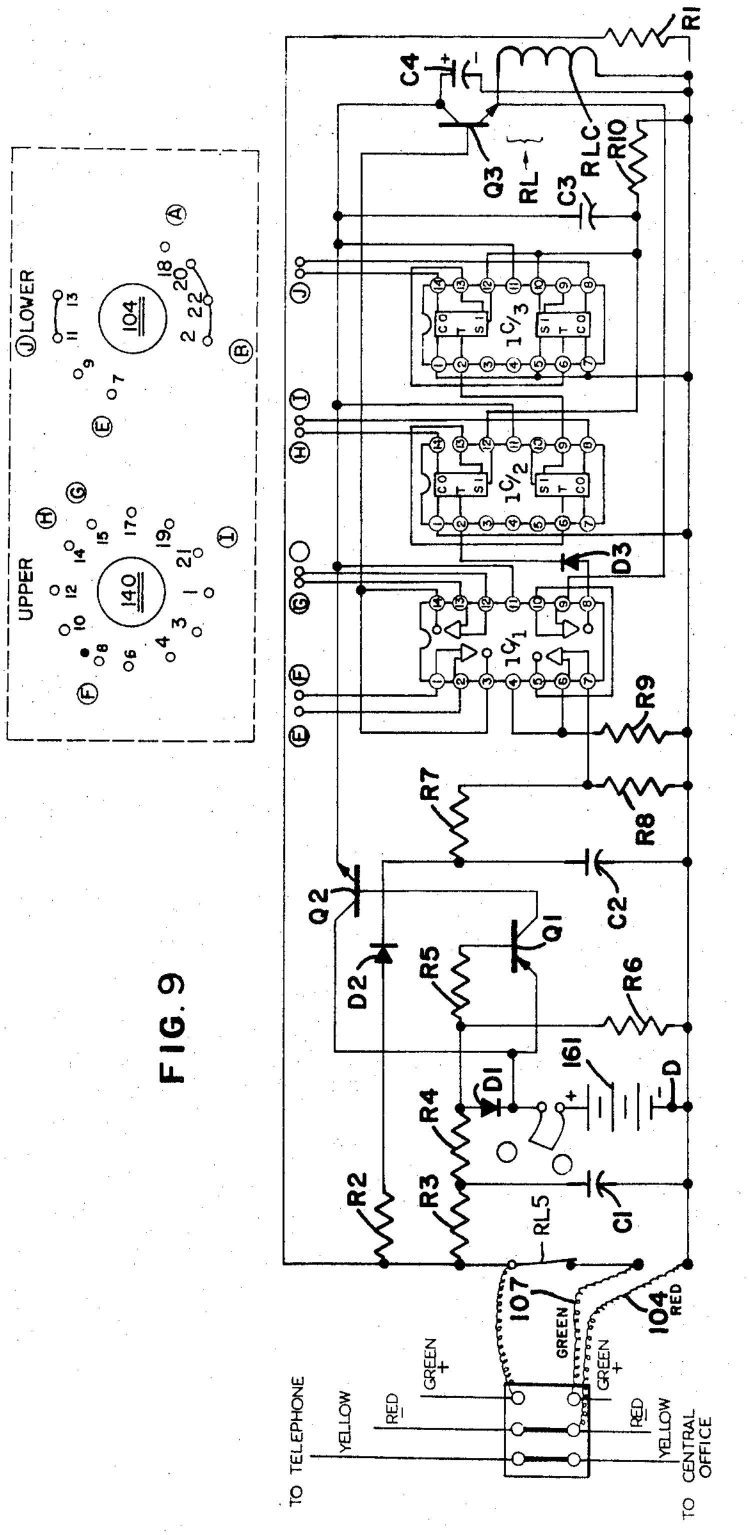
FIG. 9 is a circuit diagram of a modification of the arrangement shown in FIG. 5.

In a modification of the unit shown in FIG. 9, the incoming line is connected across the protective device as shown in FIG. 5, but relay RL is replaced with a normally closed relay and its contacts RLS are connected in series with the green wire going to the telephone set. In this variation the decoder is set for one digit more than the desired number. When more than the limited number of digits (groups of pulses) are dialed, relay RL is energized and its contacts RLS open, thereby disconnecting the telephone for a predetermined period of time.

This period of time is sufficient to cause the exchange to disconnect and thereby aborting an illicit telephone call.

This modification requires merely that in the wall box 103 the "green" wire from the telephone handset be connected and that it be connected inside the wall box to a third wire going to the lower end of resistor R1 in FIG. 5, the existing connection to the "ground" rail being omitted. The existing wires 107 and 109 remain connected to the wall box.

It will be appreciated that any security device attracts the attention of persons who wilfully seek to disenable it. It is important therefore that the security device be engineered in such a way that it is difficult if not impossible for it to be disabled without actual breakage of parts.

As described above, the present invention finds a considerable application to telephone sets of a PBX system, but the use of the invention is not limited to such systems. Thus in an ordinary household having but the one telephone set, the security device can be applied to the telephone set to prevent children from using the direct distance dialing system to make other than local calls. In such an installation the parents will have a key to disable the security device whenever desired.

Another application of the invention is to apartment houses and the like in which no PBX is provided but in which the use of the telephone is to be restricted to the making of local calls, which are of course normally uncharged calls.

By way of example, the security device has been described as applied to a single telephone. However, it can be applied to a PBX, in which case one such security device will be needed for each outgoing line. It is thus possible, in a large installation of say 600 handsets with say eight outgoing lines to put eight such security devices respectively on all eight lines and thus enable the complete PBX to be limited to local calls during the night. This enables urgent calls to the fire brigade and the police to be made, but effectively prevents janitors and cleaning staff from making use of the telephone equipment to make direct dialed long distance calls.

In a PBX having say eight outgoing lines with one such line reserved to the PBX operator and the other lines available for dialed calls, security devices could be fitted to all eight lines but that fitted to the operator's line could be switched off during working hours to permit her to make dialed long distance calls.

The number of permitted digits is determined by the manner in which the integrated circuit counters are connected, and it will be obvious to one skilled in the art that the connections shown in FIG. 5 can be varied at will to provide the desired limitation of calls.

Figure 2:
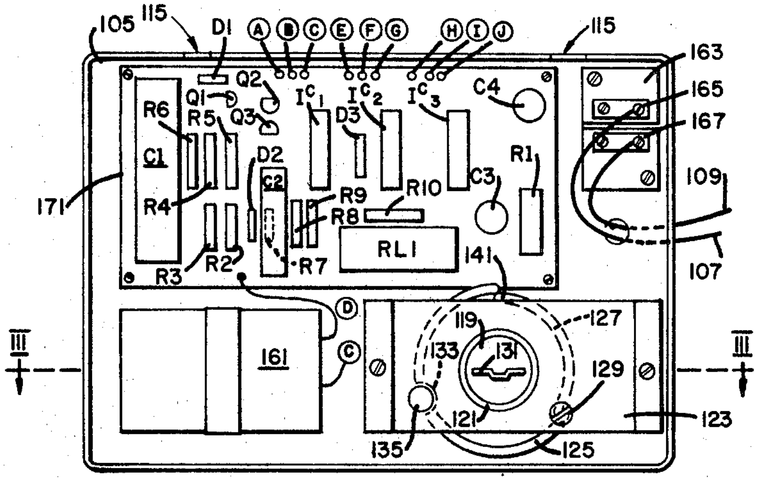
FIG. 2 is a front view of a telephone security device shown in FIG. 1, but shown in FIG. 2 with a detachable front cover removed.
Figure 8:
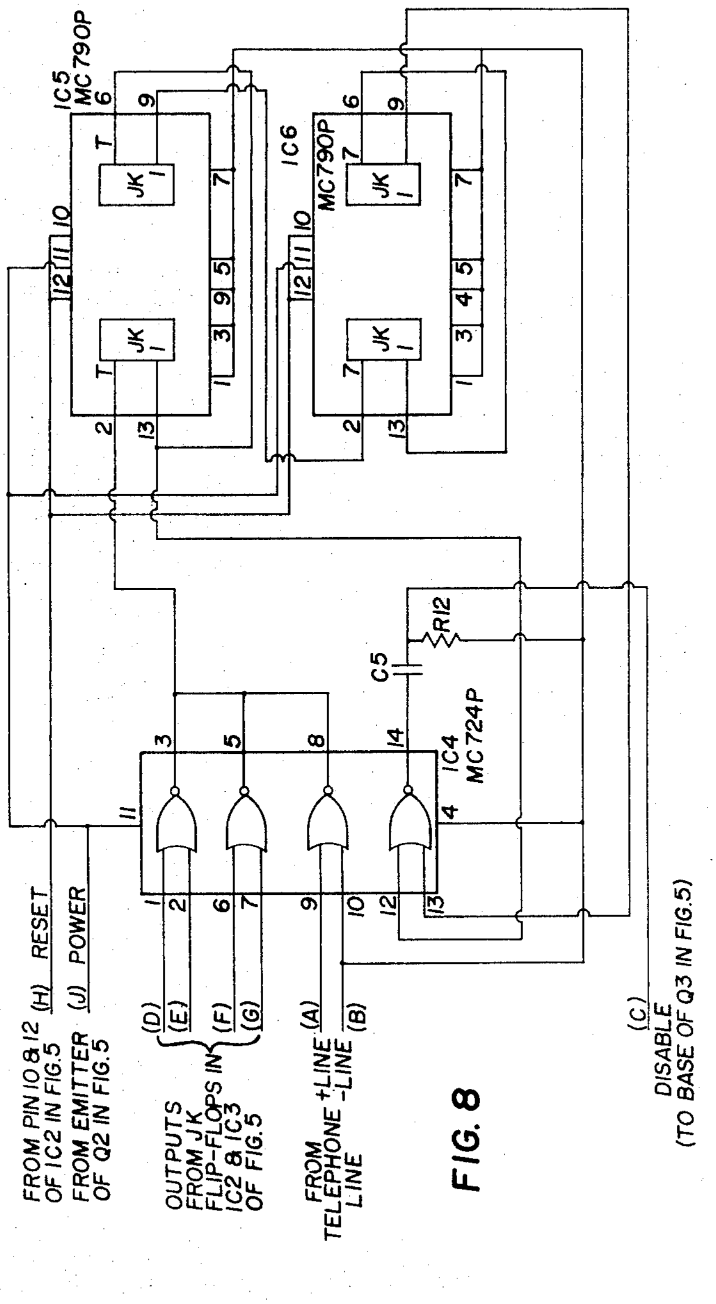
FIG. 8 is a circuit diagram of the zero detector circuit.

Referring now to the improvement shown in FIG. 8, which is the zero detector circuit of the present invention, this Figure should be read in conjunction with FIG. 5. Wires (A) and (B) in FIG. 8 attached are connected to wires 107 and 109 respectively as shown in FIGS. 5 and 2 of the original description. It should be noted that wires 107 and 109 are the only wires connecting to wires in the telephone cable connecting telephone 101 and box 103 (see FIG. 1 of the original description). Wire number 107 is connected to the green telephone wire and wire 109 is connected to the red telephone wire. The red and green telephone wires are not cut in any way since connection is being made between the two wires (parallel rather than series). Wires (D), (E), (F), and (G) in FIG. 8 are connected to the JK flip-flop outputs of IC2 and IC3 in such a manner that the dial pulses on line (A) are gated by IC4 to the IC5 and IC6 counters only on the first digit for a private phone and on the second digit for a PABX system. The gated dial pulses are counted by the four JK flip-flops in IC5 and IC6. The outputs of these flip-flops are connected to the gate in IC4 such that an output pulse is provided on wire (C) when nine dial pulses are counted. This output pulse on wire (C) (in FIG. 8) is connected to the base of Q3 in FIG. 5 thereby inhibiting the tenth dial pulse from activating the operator circuit. The IC5 and IC6 counters are reset by the reset gate on line (H) which is connected to pins 10 and 11 of IC2 and IC3.

The embodiments of the invention in which an exclusive property or privilege is claimed are defined as follows:

1. A security device suitable for use with a dial-type telephone set having a handpiece, a cradle in or on which the handpiece rests when not in use, and a rotary signalling dial, the device being adapted to restrict the use of the dial to the effective dialing of a series of digits no greater in number than a predetermined number and to prevent the effective dialing of zero to call a central station operator to make long distance calls, comprising:

a. connecting leads by which the device can be connected to terminals carrying dialed pulses from the signalling dial;
b. pulse grouping means adapted to transform groups of received separate dialing pulses each into a group pulse by distinguishing between interpulse timing periods and inter-group timing periods;
c. group-pulse counting means;
d. zero detecting means comprising an electrical circuit adapted to ascertain whether digit dial pulses applied to it represent a dialed zero, and arranged to produce an output indicative of that fact;
e. digit selection means preset to select from the group pulses either the first or the second dialed digit and to apply the dialing pulses of that selected digit to the zero detecting means; and
f. call aborting means arranged to prevent the effective transmission of dialing pulses both when the group-pulse counting means has reached a predetermined count and when the zero detecting means provides an output indicative of zero detection.

2. The security device claimed in claim 1, wherein switch means are provided by which the said predetermined count can be varied.

3. The security device claimed in claim 1, wherein an internal battery is arranged to bias a transistor switch to a conductive condition, and the line voltage is used to bias that transistor switch to a non-conductive condition, whereby when the cradle switch of the telephone set closes, the consequent fall in line voltage permits the battery to make the transistor switch conductive so energizing the group-pulse counting means.

4. The security device claimed in claim 3, wherein the line voltage normally applies through a diode charging current to the said battery.

5. The security device claimed in claim 1, wherein the call aborting means comprise a switch arranged to shunt the terminals carrying the said dialed pulses from the signalling dial, and effective to attenuate those pulses so severely as to render them ineffective.

6. The security device claimed in claim 1, wherein the call aborting means comprise a switch arranged in series with one of the pulse-carrying leads connected to the said terminals, this switch being of the "normally closed" type but being opened to prevent the transmission of pulses once the predetermined number of pulses has been received.

7. The security device claimed in claim 1, wherein the call aborting means are associated with a switch by which they can be rendered effective even before any pulses are received, whereby no digits can be effectively dialed.

8. The security device according to claim 1, wherein a rotary lock having a plurality of positions at each of which the lock key can be removed is arranged to determine the setting of the security device in accordance with the orientation of the rotary lock at the time that the key is removed.

9. The security device according to claim 8, wherein the rotary lock also has an "open" position in which it permits removal of an access cover from the security device.

* * * * *